United States Patent Office 3,470,134
Patented Sept. 30, 1969

3,470,134
PREPARATION OF MELAMINE-FORMALDEHYDE
RESINS AND PRODUCTS THEREOF
Israel S. Ungar, Baltimore, Md., assignor to Allied Chemical Corporation, New York, N.Y., a corporation of New York
No Drawing. Filed Oct. 20, 1965, Ser. No. 499,086
Int. Cl. C08g 9/30, 53/16
U.S. Cl. 260—67.6                     3 Claims

ABSTRACT OF THE DISCLOSURE

Melamine-formaldehyde resins which have thermoplasticity after curing are prepared by reacting formaldehyde with melamine in a mol ratio of 3.0:1 to 3.5:1 until the resin is miscible to the extent of one part per 1–3.5 parts of water, then adding melamine to adjust the formaldehyde-melamine mol ratio to about 2.0:1 to 2.5:1, and then heating the resulting mixture until one part of the product is miscible in 0.5–1.5 parts of water. The product is useful in making post-formable laminates.

---

This invention relates to melamine-formaldehyde resins of improved stability and to laminates made therefrom, particularly such laminates having post-formability.

Melamine-formaldehyde resins are useful for many purposes including use as impregnants for one or more of the respective plies of laminates in the formation of laminated products such as wall panels, table tops and other decorative surfaces. Such laminates are produced by bonding one or more resin-impregnated paper sheets such as sheets of alpha-cellulose to a core material comprising, for example, phenol-formaldehyde impregnated kraft paper, including kraft crepe paper, or plywood, hardboard, or particle board. In the production of decorative products, the surface sheets termed the "print" or "pattern" sheets conventionally are alpha-cellulose paper having the desired design printed, embossed or otherwise formed thereon. Melamine-formaldehyde resins are useful as the impregnating resin for the outer plies of such laminates because melamine-formaldehyde is transparent, i.e., lacks inherent color, and results in a laminated product of high gloss and good chemical resistance. The melamine-formaldehyde resin does not discolor or otherwise deleteriously affect the decorative pattern of the print or pattern sheet.

Melamine-formaldehyde resins heretofore available, however, when cured, have insufficient residual plasticity to post-form. Laminates made with such melamine-formaldehyde resins as the impregnant for the print or pattern sheets or other sheets of the laminate, generally cannot be post-formed, i.e. shaped under heat and pressure to provide curved or other desirable non-planar surfaces as may be required, for example, in the case of counter tops, table tops and other decorative items. The cured melamine formaldehyde resin employed as the binder in such laminates does not have adequate thermoplasticity for post-formability.

Post-formable melamine-formaldehyde impregnated laminates have been prepared by employing melamine-formaldehyde resins containing various additives such as polyamides, sulfonamides, carbonates and certain guanamines. Such laminates are usually under-cured to produce a laminate which can be post-formed. Under-curing results in products having relatively poor surface quality; often a tendency to yellow occurs and the resistance of the laminate to boiling water may be decreased. The additives themselves sometimes adversely affect the quality of the final product in one way or another, as by reducing transparency and often add to the cost of the final product.

Another limitation of melamine-formaldehyde resins heretofore available has been their tendency to become increasingly viscous on standing, thus necessitating use within 24 to 48 hours. With the addition of stabilizers, such resins have been known to remain fluid for as long as 30 days. Also spray drying has been used to stabilize the resins. Both of these stabilization methods, however, add to the cost of the final product.

It is a principal object of this invention to provide novel melamine-formaldehyde resins which have thermoplasticity even after curing under curing conditions normally employed in producing laminates.

It is another object of this invention to provide such resins which have improved stability in the absence of stabilizers or spray drying.

It is another object of this invention to provide melamine-formaldehyde resins which, among other uses, can be employed to form post-formable laminates.

Another object of this invention is to provide post-formable laminates having at least the surface layer sheet thereof, e.g., the decorative or print sheet, impregnated with the melamine-formaldehyde resins of this invention.

Another object is to provide processes for producing such resins and laminates.

Other objects and advantages of this invention will be apparent from the following detailed description thereof.

In this specification, all parts and percentages are given on a weight basis.

The resins of this invention are the reaction products of melamine and formaldehyde containing from 2.0 to 2.5 mols of formaldehyde per mole of melamine and having a miscibility of 1 part in 0.5 to 1.5 parts of water at 25° C. Such resins, surprisingly, at elevated temperatures have sufficient thermoplasticity, even after the resin has been cured, to produce post-formable laminates in which one or more of the fibrous laminating plies are impregnated therewith.

These resins are in the form of syrups having a resin solids content of about 40 to 65%.

The present invention thus includes the melamine-formaldehyde resins as well as the laminates made by impregnating the fibrous plies or layers of the laminate, particularly the decorative or print sheets, with such resins and subjecting the resultant assemblies to heat and pressure to cure the resin and bond the layers of each assembly together to produce the post-formaldehyde laminates.

In accordance with the process of this invention, melamine and formaldehyde are reacted in the proportions of from 3.0 to 3.5 mols of formaldehyde per mol of melamine at a pH of from 8 to 10 and at a temperature of about 50° to about 110° C., preferably 90° to 100° C. until one part of the resulting resin is miscible in 1 to 3.5 parts of water at 25° C.; melamine is added to reduce the mol ratio of 2.0 to 2.5 mols of formaldehyde per mol of melamine and this mixture is heated at about 50° to about 110° C., preferably 90° to 100° C., until 1 part by weight of the resulting resin is miscible in 0.5 to 1.5 parts of water at 25° C.

It is necessary to employ temperatures of at least 50° C. in order to assure sufficient reaction of the melamine and formaldehyde, but temperatures of 90° to 110° give a more acceptable reaction rate. The use of temperatures above 100° C. has the disadvantage of requiring more costly pressure-resistant equipment.

The additional melamine is introduced while the initial reaction product is still at a temperature of 50° to 110° C.

The formaldehyde can be formaldehyde of commerce, e.g. 10–55% aqueous formaldehyde, such as formalin (a solution containing about 37% by weight of formaldehyde in water, usually with 10–15% methanol to prevent polymerization), paraformaldehyde, trioxymethylene and other formaldehyde copolymers which decompose to form formaldehyde. The expression "formaldehyde" is used in the claims to include formaldehyde polymers and compounds which release formaldehyde.

When more than 2.5 mols formaldehyde per mol of melamine is present in the final product it tends to be brittle after curing. Less than 2.0 mols of formaldehyde per mol of melamine results in a resin syrup having a short storage life and decreased resistance to hot water after curing.

While the reason for this resinous product having thermoplastic properties after curing is not fully understood, it is believed that the second increment of melamine functions as a modifier. It is believed that some of the melamine added in the second increment remains unreacted under the conditions of the process, and perhaps even under subsequent curing conditions and acts as an internal plasticizer. The net result is that the resin thus obtained has adequate thermoplastic properties after normal curing for it to be used for the impregnation of the fibrous layers or plies of laminates to produce post-formable laminates.

What is even more surprising is that the resin products of this invention are stable at room temperature for periods of two weeks or more in the absence of any additional stabilizers. That is, they are still sufficiently fluid to be easily handled.

The amount of resin incorporated in the sheets of the laminates depends chiefly on the desired properties of the laminated product. In general, from 35% to 70% of resin based on the weight of the paper, textile or other sheets of the laminate, can be used. The melamine-formaldehyde resins of this invention are particularly applicable to the impregnation of the decorative sheet of paper or various textile materials such as cotton, glass or nylon, used as the outer layer or ply of the laminate to produce normally rigid laminates which are post-formable when heated to forming temperatures. Such laminates frequently contain a core consisting of a plurality of paper plies bonded with thermosetting resin, such as the phenolic resins. In some cases these laminates have a core consisting of a board base such as particle board in which cellulosic particles are bonded with a thermosetting resin under high pressures. The expression "fibrous" is used herein in a broad sense to include paper as well as such textiles made from fibers or filaments of nylon, glass or other synthetic textile materials.

The following examples are given for illustrative purposes. It will be understood that this invention is not limited to these examples.

EXAMPLE 1

A slurry was prepared containing 276 parts of melamine, 624 parts of 37% formaldehyde (formaldehyde:melamine mol ratio=3.5), and 75 parts of water. The pH was adjusted to 9.0 with 20% sodium hydroxide solution and the mixture was heated at reflux temperature (about 100° C.) and atmospheric pressure with stirring until a water miscibility of about 1.55 parts water in 1 part resin at 25° C. was obtained. Then 181 parts of melamine was added for a final formaldehyde:melamine mol ratio of 2.1:1. The temperature of the mixture dropped to 90° C. as the melamine was added. After the melamine was dissolved the mixture was heated 10 minutes longer and then cooled to room temperature. Final miscibility was about 1 part water to 1 part resin at 25° C. This resin was stable for two weeks.

EXAMPLE 2

A slurry was prepared containing 320 parts of melamine, 624 parts of 37% formaldehyde (formaldehyde:melamine mol ratio=3.0) and 75 parts of water. The pH was adjusted to 9.0 with 20% sodium hydroxide solution and the mixture was heated for about 40 minutes at reflux temperature (about 100° C.) and atmospheric pressure with stirring until a water miscibility of about 1.7 parts of water in 1 part resin at 25° C. was obtained. Then, 137 parts of melamine was dissolved in the mixture for a final formaldehyde:melamine ratio of 2.1, and the mixture was heated at 90° C. for 10 minutes after solution was completed then cooled to room temperature. The final water miscibility of the cooled resin was about 0.95 part water per part of resin. Water miscibility of the product remained above 0.5 part water to 1 part resin for 2 weeks.

EXAMPLE 3

Decorative laminates were prepared as follows: Sheets of kraft paper and sheets of kraft crepe paper were impregnated with a commercial phenolic laminating varnish. Sheets of bleached alpha-cellulose paper, having a design printed thereon, were impregnated with the resin syrup of Examples 1 and 2 above respectively, to a resin content of about 45%. Sheets of thin, unprinted alpha-cellulose paper were also impregnated with the resin syrup of Examples 1 and 2 to a resin content of about 70%. The impregnated sheets were dried to remove excess volatiles. Separate laminates were made using the sheets impregnated with the resins of Examples 1 and 2, respectively, as follows: Three sheets of phenolic impregnated kraft crepe, two sheets of phenolic impregnated kraft, one printed sheet and one unprinted alpha-cellulose sheet were stacked, in that order, and the assembly was laminated under 1000 p.s.i., for 18 minutes, at 260° to 275° F. Each product was an attractive laminate which could be post-formed over a ½" radius mandrel at 275° F. in accordance with the procedure described in National Electrical Manufacturers Association Standards Publication LP2–1957. The laminates had an attractive appearance, high surface gloss and good chemical and physical resistance.

Since various changes and modifications can be made in this invention as hereinabove described without departing from the scope thereof, the invention is not to be limited to this description except as indicated by the appended claims.

I claim:
1. A process for producing a melamine-formaldehyde resin which comprises reacting formaldehyde with melamine in a mol ratio of 3.0:1 to 3.5:1 at a pH of from 8 to 10 and at a temperature of from about 50° to about 110° C. until one part of the resulting resin is miscible in 1 to 3.5 parts of water at 25° C., adding sufficient melamine to said resin to reduce the mol ratio of formaldehyde to melamine to about 2.0:1 to 2.5:1 and heating the resulting mixture at 50° to about 110° C. until one part of the resulting product is miscible in 0.5 to 1.5 parts of water at 25° C.

2. The process of claim 1 wherein all the heating is carried out at a temperature in the range 90° to 100° C.

3. A melamine-formaldehyde resin consisting essentially of 2.0 to 2.5 mols of formaldehyde per mol of melamine and having a miscibility of one part by weight in 0.5 to 1.5 parts by weight of water at 25° C., and prepared by the process of claim 1.

References Cited

UNITED STATES PATENTS 3,082,180   3/1963   Boldizar et al. _____ 260—67.6
3,202,635   8/1965   Galinke _____ 161—263

WILLIAM H. SHORT, Primary Examiner

T. PERTILLA, Assistant Examiner

U.S. Cl. X.R.

161—257, 259, 263